(12) United States Patent
Esperer et al.

(10) Patent No.: US 10,902,129 B2
(45) Date of Patent: Jan. 26, 2021

(54) METHOD FOR DETECTING VULNERABILITIES IN SOFTWARE

(71) Applicant: Virtual Forge GmbH, Heidelberg (DE)

(72) Inventors: Hans-Christian Esperer, Heidelberg (DE); Yun Ding, Heidelberg (DE); Thomas Kastner, Sinsheim (DE); Markus Schumacher, Einhausen (DE)

(73) Assignee: Virtual Forge GmbH, Heidelberg (DE)

( * ) Notice: Subject to any disclaimer, the term of this patent is extended or adjusted under 35 U.S.C. 154(b) by 321 days.

(21) Appl. No.: 15/834,381

(22) Filed: Dec. 7, 2017

(65) Prior Publication Data
US 2019/0180035 A1   Jun. 13, 2019

(51) Int. Cl.
G06F 21/57    (2013.01)
G06F 8/41     (2018.01)
G06F 21/53    (2013.01)

(52) U.S. Cl.
CPC .............. G06F 21/577 (2013.01); G06F 8/42 (2013.01); G06F 21/53 (2013.01); G06F 8/41 (2013.01); G06F 2221/033 (2013.01)

(58) Field of Classification Search
CPC .......... G06F 21/53; G06F 21/577; G06F 8/42
See application file for complete search history.

(56) References Cited

U.S. PATENT DOCUMENTS

| | | | | |
|---|---|---|---|---|
| 8,060,869 | B1* | 11/2011 | Panchenko | G06F 8/44 711/3 |
| 2004/0133875 | A1* | 7/2004 | Kramer | G06F 8/20 717/101 |
| 2014/0165204 | A1 | 6/2014 | Williams et al. | |
| 2014/0359776 | A1* | 12/2014 | Liu | H04L 63/1466 726/25 |
| 2017/0220798 | A1* | 8/2017 | Madou | G06F 21/552 |
| 2017/0249130 | A1* | 8/2017 | Smiljanic | G06F 8/43 |
| 2017/0316202 | A1 | 11/2017 | Roichman | |
| 2017/0344746 | A1* | 11/2017 | Tripp | G06F 11/3668 |
| 2018/0107821 | A1* | 4/2018 | Eshkenazi | G06F 21/51 |
| 2018/0285238 | A1* | 10/2018 | Somesula | G06F 11/302 |
| 2019/0114435 | A1* | 4/2019 | Bhalla | G06F 21/55 |

OTHER PUBLICATIONS

European Search Report of the European Patent Office in EP17205995.8 dated May 30, 2018 in English.

* cited by examiner

*Primary Examiner* — Vance M Little
(74) *Attorney, Agent, or Firm* — Brinks Gilson & Lione

(57) ABSTRACT

A method, an apparatus, and a storage medium for detecting vulnerabilities in software to protect a computer system from security and compliance breaches are provided. The method includes providing a ruleset code declaring programming interfaces of a target framework and including rules that define an admissible execution context when invoking the programming interfaces, providing a source code to be scanned for vulnerabilities; compiling the source code into a first execution code having additional instructions inserted to facilitate tracking of an actual execution context of the source code, compiling the ruleset code into a second execution code that can be executed together with the first execution code, executing the first execution code within an virtual machine and passing calls of the programming interfaces to the second execution code, and detecting a software vulnerability when the actual execution context disagrees with the admissible execution context.

19 Claims, 5 Drawing Sheets

METHOD FOR DETECTING VULNERABILITIES IN SOFTWARE

TECHNICAL FIELD

The present invention relates to detecting vulnerabilities in software, and more particularly, to a method, a compiler, and a virtual machine for detecting vulnerabilities in software.

BACKGROUND

Software applications which contain vulnerabilities can lead to security and compliance breaches of computer systems. If this occurs, the business of the organization running the application is endangered through loss of critical or protected data, loss of reputation, loss of business, or lawsuits. In addition, the computer system may be damaged or impaired. Therefore, it is industry best practice to perform dedicated Application Security Testing (AST) to effectively mitigate these risks.

An established method for looking for security defects is Static Code Analysis (SCA) or Static Application Security Testing (SAST). They analyze an application's source code or bytecode for security vulnerabilities, typically at the early stages of the software development life cycle (SDLC). Traditional SCA tools were designed for languages with a static type system. A static type system enforces certain properties of the code at design time, which cannot be altered at runtime based on the code's control flow. A static type system therefore makes reasoning about code's behavior without executing the code reliable, while yielding an acceptable false positive rate. "False positive" refers to an erroneously identified problem by the code analysis tool that does not exist.

Another standard analysis method is to observe an application in its dynamic running state during execution. It simulates attacks against an application to analyze the reaction of the application to determine whether the software application is vulnerable. This is commonly known as dynamic code analysis or Dynamic Application Security Testing (DAST). The advantage of this approach is the precision of the analysis, since no guesses about the code's behavior are necessary.

Interactive AST (IAST) combines inside-out observation of a running application being tested with DAST simultaneously. IAST is typically implemented as an agent within the test runtime environment, for example, instrumenting the Java Virtual Machine (JVM), that observes operation or attacks from within the application and identifies vulnerabilities. In the following, IAST is considered as a special type of DAST.

Both the DAST and IAST approach have the following limitations. Firstly, to observe the behavior of an application, its code needs to be compiled and executed, which means that the code must be fully functional before it can be analyzed, and an execution environment must be available. Thus, DAST and IAST cannot be used during the early stages of software development. Secondly, DAST and IAST may cause side effects; for example, database altering code will alter the database while the code is being scanned. Not only does this limit the number of times a scan can be performed, it also prescribes the times at which a scan can be performed.

Further, scans with side effects cannot be reliably reproduced if the runtime environment cannot be preserved. Lastly, only the branches of the source code that are actually executed can be analyzed. Dead branches and branches that are not reached during testing or normal operation stay unnoticed during analysis, but they may be reached by specifically crafted input of an informed adversary.

Dynamically typed languages such as JavaScript-based languages are increasingly used in critical applications. For example, to access an SAP HANA database, the server-side JavaScript SAP XS JavaScript (XSJS) and SAP HANA XS advanced (XSA) as well as the client-side JavaScript-based SAPUI5 can be used. Security testing for dynamically typed languages in applications in early stages of SDLC is becoming increasingly important.

There are vendors that offer SCA tools for JavaScript-based languages. There are also vendors that offer DAST tools for JavaScript-based languages, whereas the scan is performed against a deployed and running application. As of today, there is no tool which can combine the advantages of SAST, DAST and IAST, i.e., perform hybrid AST in early stages of SDLC, for security testing of dynamically typed languages in a single environment.

In a dynamically typed language, types are assigned to values at runtime, not to variables during compilation. This means that during compilation, fewer assumptions can be made about the behavior of the code when compared to statically typed languages.

For example, a SQL statement should be executed. In a statically typed language an interface called SQLConnection may exist. That interface defines a method called prepareStatement, which in turn expects a parameter of type String. From the usage of that interface, certain properties about the code can be inferred.

In particular, it can be inferred that a database operation is executed, and that the string (as an input parameter) will be parsed and executed by the database. Thus, the parameter given to the prepareStatement-method must not contain non-escaped or wrongly escaped user input. By looking at the types of the functions that were called to produce the string, user input can be recognized and analyzed.

Without types, other ways of reasoning about the code to be scanned must be used. A common naive approach is to use the name of a function to guess its behavior. While function names for APIs generally match their purpose, this approach is limited by various factors as follows.

Functions are first class citizens in many modern languages, including JavaScript. They can be arbitrarily passed around, including as parameters to other functions and as return values from functions (typically referred to as higher order functions). The following code excerpt illustrates the problem with name matching:

Listing 1 A simple example

```
1 var useNewDbApi = false;
2 var db = useNewDbApi ? $.hdb.getConnection( ) :
    $.db.getConnection( );
3 var prep = db.prepareStatement;
4 prep("UPDATE patents SET approved=true WHERE patent='vfvm'");
```

The function prepareStatement is renamed by assigning it to the variable prep. A simple name matching would thus fail in this case. This example can be mitigated by a simple data flow analysis. However, the code can be made arbitrarily complex, to the point where data flow analysis will fail.

This is demonstrated by the example shown in the following listing. The hash algorithms SHA-1 and MD5 are insecure and thus disallowed. The scanner should generate findings if either a SHA-1 or an MD5 hash algorithm is used. A finding refers to an identified vulnerability.

```
                    Listing 2A hashing example
 1  var getHashingFunctionByAlg(alg) {
 2      if (alg === null || alg === undefined) return "You need to
           specify a hash function";
 3      else if (alg === "md5") return MD5Hash;
 4      else if (alg === "sha1" || alg === "sha") return SHA1Hash;
 5      else if (alg === "secure") return SHA256Hash;
 6      if (getYear( ) > 2016) return SHA256Hash;
 7      return MD5Hash;
 8  } function hash(alg) {
 9      var fun = getHashingFunctionByAlg(alg);
10      var hash = new fun ( );
11      return function(plain) {
12          hash.init(plain); return hash.finish( ); } }
13 var hashedValue = hash("SHA256")("StringtoHash");
```

In the given example, a finding should be generated for line 13, because, while the user requests a SHA-256 algorithm to be used, the function expects the string "secure" for SHA-256 hashing, not the string "SHA256". When the specified algorithm is not recognized, MD5 will be used if the year is 2016 or earlier, else SHA-256 will be used. Ideally, another finding should be generated, because the function alters its behavior based on an external state and returns a hash function depending on the year it is executed in.

The hash example illustrates another problem that is also present when using the types of statically typed languages to scan the code for vulnerabilities. Because the type that is typically used for hashing algorithms, the type only reflects the class of the cryptographic service used, but not the specific algorithm. For example, the Java cryptography API defines classes for the following cryptographic services: Cipher, MessageDigest and Signature. The implementation instance for a particular cryptographic algorithm (for example, SHA-256) is created by calling MessageDigest.getInstance("SHA-256").

The above two examples illustrate the limitations of static code analysis with name matching, and compile time data flow analysis, even in cases where type information is available during compilation.

SUMMARY

It is an object of the present invention to more accurately detect vulnerabilities in software written in dynamically typed programming languages to protect a computer system on which the software is executed from security and compliance breaches.

According to a first aspect of the invention, a computer-implemented method for detecting a vulnerability in software to protect a computer system from at least one of a security breach and a compliance breach is provided. The method includes the steps of providing a ruleset code declaring programming interfaces of a target framework and including rules that define an admissible execution context when invoking the programming interfaces, providing a source code to be scanned for a software vulnerability, compiling the source code into a first execution code having additional instructions inserted to facilitate tracking of an actual execution context of the source code, compiling the ruleset code into a second execution code that can be executed together with the first execution code, executing the first execution code within a virtual machine and passing a call of the programming interfaces to the second execution code, and detecting the software vulnerability when the actual execution context disagrees with the admissible execution context.

The method allows accurately detecting vulnerabilities in software written in dynamically typed programming languages. The computer system on which the software written in the dynamically typed programming language is executed after potential vulnerabilities are detected and removed, is protected from security and compliance breaches, and the functionality of the computer system is thereby improved. Thus, by detecting and removing the vulnerabilities in the software, data in the computer system in which the software is executed is better protected and damages or impairments of the computer system are prevented.

The target framework is defined as a universal, reusable software environment that provides particular functionality as part of a larger software platform to facilitate development of software applications, products, and solutions. Frameworks may include support programs, compilers, code libraries, tool sets, and application programming interfaces (APIs) that bring together all the different components to enable development of a project or system.

The programming interface is defined as a set of subroutine definitions, protocols, and tools for building application software, like application programming interfaces. A virtual machine is an emulation of a computer system. Virtual machines are based on computer architectures and provide functionality of a physical computer. Their implementations may involve specialized hardware, software, or a combination thereof. The virtual machine is designed to execute computer programs, like the execution code, in a platform-independent and closed environment.

The source code is any collection of computer instructions, possibly with comments, written using a human-readable programming language, usually as plain text, e.g., Java or JavaScript. The ruleset code provides stubs for all functions and classes of the original programming interfaces, and replicates the constants of the original programming interfaces. In addition, the ruleset code includes information about an admissible execution context when invoking programming interfaces, like information for determining if the programming interface shall or shall not be invoked from a loop, or if input parameters have been properly sanitized. The execution context includes information about the dynamic program conditions when the source code is executed, like the types of values. The source code and the ruleset code can be provided as electronic files.

According to an exemplary embodiment of the invention, each function of the source code is invoked once.

According to a further exemplary embodiment of the invention, branch instructions and the return instructions are ignored.

According to another exemplary embodiment of the invention, the virtual machine provides an execution context to the ruleset code.

According to a further exemplary embodiment of the invention, the virtual machine provides interception calls to the ruleset code and continues execution.

According to a further exemplary embodiment of the invention, the virtual machine builds data flow graphs.

According to another exemplary embodiment of the invention, data flow graphs are used by the ruleset code to attach data flow information to a finding.

According to yet another exemplary embodiment of the invention, the source code is compiled into bytecode which is suitable for code analysis.

According to a further exemplary embodiment of the invention, syntax errors do not abort the compilation of the source code.

According to a further exemplary embodiment of the invention, during compilation, instructions are generated to inform the rule engine of syntax errors that occurred during compilation.

According to a second aspect the invention, one or more non-transitory computer readable storage media for detecting vulnerabilities in software to protect a computer system from at least one of a security breach and a compliance breach are provided, the one or more non-transitory computer readable storage media being encoded with computer executable instructions of a compiler, and, when the computer executable instructions are executed, being operable to compile a source code into a first execution code and a ruleset code into a second execution code, the compiler including a first interface configured to receive a ruleset code declaring programming interfaces of a target framework and including rules that define an admissible execution context when invoking the programming interfaces, a second interface configured to receive a source code to be scanned for a software vulnerability, first compiling means configured to compile the source code into a first execution code having additional instructions inserted to facilitate tracking of an actual execution context of the source code, and second compiling means configured to compile the ruleset code into a second execution code to be executed together with the first execution code.

According to a third aspect of the invention, one or more non-transitory computer readable storage media are provided for detecting vulnerabilities in software to protect a computer system from at least one of a security breach and a compliance breach, the one or more non-transitory computer readable storage media being encoded with computer executable instructions of a virtual machine, and, when the computer executable instructions are executed, being operable to execute a first execution code and to pass calls of programming interfaces to a second execution code. The virtual machine includes an interface configured to receive a first execution code having additional instructions inserted to facilitate tracking of an actual execution context of the source code, an interface configured to receive a second execution code that declares programming interfaces of a target framework and includes rules that define an admissible execution context when invoking the programming interfaces, execution means configured to execute the first execution code within an virtual machine and to pass calls of the programming interfaces to the second execution code, and detecting means configured to detect a software vulnerability when the actual execution context disagrees with the admissible execution context.

According to a fourth aspect of the invention, an apparatus for detecting vulnerabilities in software to protect a computer system from at least one of a security breach and a compliance breach is provided. The apparatus includes one or more non-transitory computer readable storage media, and a processor coupled to the one or more non-transitory computer readable storage media. The processor compiles a source code into a first execution code having additional instructions inserted therein to facilitate tracking of an actual execution context of the source code, the source code being provided to be scanned for a software vulnerability. The processor further compiles a ruleset code into a second execution code to be executed together with the first execution code, the ruleset code declaring programming interfaces of a target framework and including rules that define an admissible execution context when invoking the programming interfaces, executes the first execution code within a virtual machine and passes calls of the programming interfaces to the second execution code, and detects a software vulnerability when the actual execution context disagrees with the admissible execution context.

According to a fifth aspect of the invention, a compiler is provided. The compiler includes an interface for receiving a ruleset code declaring programming interfaces of a target framework and including rules that define an admissible execution context when invoking the programming interfaces, an interface for receiving a source code to be scanned for vulnerabilities, a compiling means for compiling the source code into a first execution code having additional instructions inserted to facilitate tracking of an actual execution context of the source code; and a compiling means for compiling the ruleset code into a second execution code that can be executed together with the first execution code.

According to a sixth aspect the invention, a virtual machine is provided. The virtual machine includes an interface for receiving a first execution code having additional instructions inserted to facilitate tracking of an actual execution context of the source code, an interface for receiving a second execution code that declares programming interfaces of a target framework and includes rules that define an admissible execution context when invoking the programming interfaces, an execution means for executing the first execution code within an virtual machine and passing calls of the programming interfaces to the second execution code, and a detecting means for detecting a software vulnerability when the actual execution context disagrees with the admissible execution context.

BRIEF DESCRIPTION OF THE DRAWINGS

Exemplary embodiments of the invention will now be described with reference to the drawings wherein.

DESCRIPTION OF EXEMPLARY EMBODIMENTS

Figure 1:
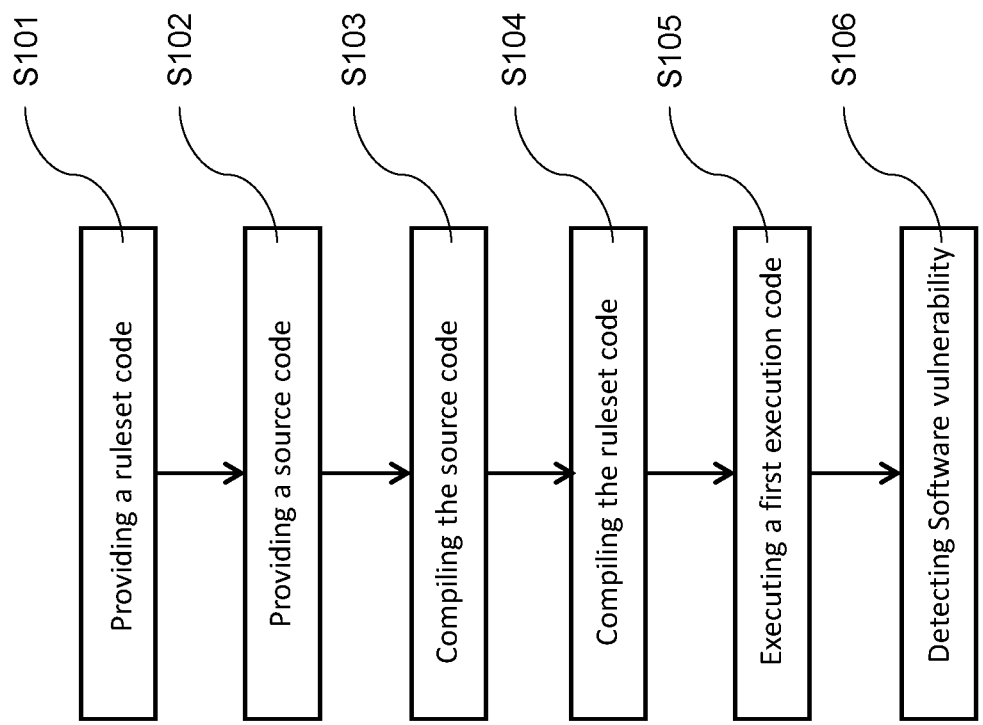
FIG. 1 is a block diagram showing a method for detecting vulnerabilities in software to protect a computer system from security and compliance breaches according to an exemplary embodiment of the invention.

FIG. 1 shows a block diagram of a method for detecting vulnerabilities in software. The method begins with step S101 in which a ruleset code is provided which declares programming interfaces of a target framework and which includes rules that define an admissible execution context when invoking the programming interfaces. In step S102, a source code to be scanned for vulnerabilities is provided. The ruleset code as well the source code are received by a compiler.

In step S103, the source code is compiled into a first execution code having additional instructions inserted to facilitate tracking of an actual execution context of the source code. In Step S104, the ruleset code is compiled into a second execution code that can be executed together with the first execution code. In step S105, the first execution code is executed within a specifically designed virtual machine and calls of the programming interfaces are passed to the second execution code. In step S106, a software vulnerability is detected when the actual execution context disagrees with the admissible execution context.

The method allows identifying security and compliance vulnerabilities in software applications written in dynamically typed programming languages. As a result, a code analysis tool is created, referred to as the scanner or VM scan environment. The VM scan environment executes the source code of the application in a dedicated virtual machine (VM) environment to detect security and compliance vulnerabilities which are referred to as findings.

The approach of the method is a hybrid AST approach. To overcome the limitations of SAST for dynamically typed programming languages, the source code to be analyzed is executed. To avoid the disadvantages of the DAST and IAST approaches, a specially designed compiler and a controlled execution environment in the form of a virtual machine is used.

The VM scan environment is a virtual machine designed to facilitate code analysis. The instruction set of the virtual machine is designed to support dynamically typed programming languages like JavaScript. The instruction set provides instructions that are used by the compiler to annotate the executed code to keep track of the execution context. The rule engine implemented by the ruleset code intercepts API calls of the source code to be analyzed. Thus, it allows the VM scan environment to identify security and compliance vulnerabilities.

The source code to be analyzed and the source code of the ruleset code are compiled by the compiler into bytecode. The compiled source code to be analyzed and the bytecode of the ruleset code are both executed within the VM scan environment. By intercepting API calls, the ruleset identifies security and compliance vulnerabilities, and reports findings. The findings can be transformed into human-readable representations, and into machine-readable exchange formats.

The compiler uses an annotated compilation technique to compile the source code to be analyzed into bytecode which is suitable for code analysis, i.e., the first execution code. The resulting bytecode is not a direct translation of the source code. Instead, annotations and VM specific instructions are inserted to facilitate the tracking of execution context during dynamic code analysis. The compiler also injects instrumentation instructions into the bytecode to provide additional context information to the rule engine. Syntax errors do not abort the annotated compilation; instead, the compiler generates instructions in the resulting bytecode to inform the rule engine of syntax errors that occurred during compilation.

The ruleset code is compiled to permit the generated ruleset bytecode, i.e., the second execution code, to be executed within the VM scan environment. Compilation of ruleset code is referred to as concrete compilation in contrast to annotated compilation. During execution of the compiled source code, the ruleset code intercepts API calls to generate findings.

The VM scan environment has two operational modes, i.e., an annotated execution mode and a concrete execution mode. Bytecode to be analyzed is executed twice, once in the annotated execution mode and once in the concrete execution mode, while the ruleset code is executed only once in concrete execution mode. During both execution modes, the VM scan environment is responsible for building the data flow graph and provides the actual execution context to the ruleset code.

The annotated execution mode ignores branching instructions, like IF- or ELSE-instructions, and executes each declared function exactly once. Therefore, the VM scan environment can reveal vulnerabilities in branches of the source code which would go unnoticed during normal execution, and vulnerabilities in functions which are unused. This reduces the false negative rate. "False negative" refers to a real problem that was erroneously not identified by the code analysis tool.

The VM scan environment is tolerant to incomplete or erroneously behaving bytecode to be analyzed. In case of errors, it generates interception calls to the ruleset code and continues execution. Thus, the approach allows code analysis during early stages of software development, where no working code is available.

By running code analysis within a virtual machine, the side effects of the code are limited to the VM Scan Environment. No impact or harm to the normal operation environment is caused. Since the simulated environment can be reset for each scan, the tests are reproducible.

To define rules for code analysis through interception of calls of application programming interfaces (API), the supported APIs of the target programming language or framework must be declared. The ruleset code provides stubs for all functions and classes of the original API, and replicates the constants of the original API. The ruleset code can use placeholder values to avoid the need for actual user input. To allow interactive code analysis, the ruleset code can also be programmed to read interactively input from the user, and to call real world APIs. However, the ruleset code ensures that only such API calls are passed to the real world that do not allow the code to be analyzed to alter the real-world environment.

Figure 2:
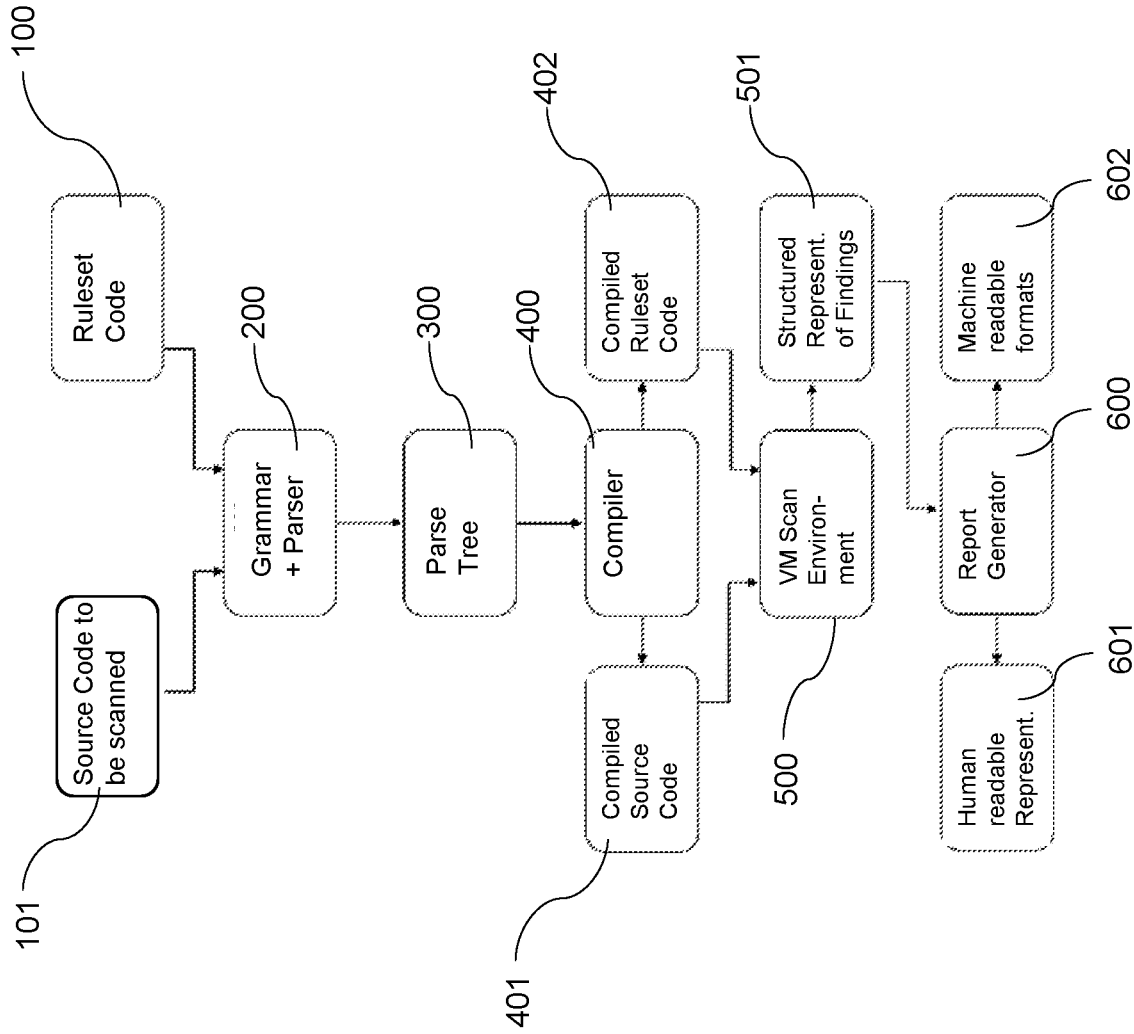
FIG. 2 is a flow diagram showing a method for detecting security and compliance vulnerabilities in a software application written in a dynamically typed programming language.

FIG. 2 shows a further flow diagram of the method and the components as well as the interaction between the components. The method addresses security and compliance vulnerabilities in software applications written in dynamically typed programming languages.

Ruleset code 100 is written in a custom language based on JavaScript, regardless of the target language to be analyzed. Ruleset code 100 implements the API of the target programming environment or framework. When the source code 101 to be scanned runs inside the VM scan environment 500, API calls from that source code 101 are intercepted and processed by the ruleset code 100.

For the language of the source code 101 to be scanned, a grammar 200 needs to be created. From the grammar 200 of the language, a language-specific parser and lexer are generated. Both the source code 101 to be analyzed and the ruleset code 100 are parsed. The resulting parse trees 300 are then used by the compiler 400 to generate compiled source code 401, i.e., bytecode, as first execution code and compiled ruleset 402 as second execution code.

The compiler 400 has two operational modes, called annotated compilation and concrete compilation.

Annotated Compilation:

Source code 100 to be analyzed is compiled in an annotated compilation mode, meaning that the resulting bytecode will not be a precise, direct translation of the source code 100. Instead, the bytecode will be annotated to facilitate the detection of vulnerabilities; the tracking of execution context during dynamic analysis; and to limit the execution time to ensure a scan always finishes in finite time. The table below shows flags to annotate values. The table shows which flags exist, who sets them, and what their meaning is.

| Value Flag | Set By | Meaning |
| --- | --- | --- |
| IS_LITERAL | Virtual Machine | The value is hard coded in a source file |
| IS_EXCEPTION | Compiler | Marks objects that represent exceptions |
| IS_ITERATOR | Compiler | Marks functions that are iterators |
| USER_INPUT | Ruleset code | Marks user input |
| SQL_OUTPUT | Ruleset code | Marks database output |
| IS_HTML_ESCAPED | Ruleset code | Marks sanitized HTML data |
| IS_URL_ESCAPED | Ruleset code | Marks sanitized URL parameters |

The VM Scan Environment 500 is a virtual machine with its own instruction set. The instructions are referred to as virtual machine instructions. The compiler inserts VM instructions to keep track of the execution context, and generates instrumentation instructions.

Value Flags are used to annotate values. For example, the flag USER_INPUT indicates that a value contains user input, while the flag SQL_OUTPUT indicates that a value contains database content from an SQL query. Other examples are IS_HTML_ESCAPED or IS_URL_ESCAPED indicating whether information contained in a variable has been sanitized. A Flag Set is used by the virtual machine to store flags per value. Value flags can be set by the compiler during annotated compilation, by the virtual machine during execution, or by the ruleset code as shown in the above table.

A state stack is a stack used by the VM scan environment to keep track of the execution context of a function by using state flags. Note that the state stack is a separate data structure independent of the execution stack. For example, the state flag FOR_LOOP and WHILE_LOOP indicate that a function call, for example a call to the database API executing an "SQL SELECT" query, is made inside the execution context of a loop. Further examples of state flags are IF and ELSE.

The execution context of a function is altered each time a loop is entered or left, each time a conditional block is entered or left, and each time a function is entered or left. The execution context also contains information about the conditions that were or were not met when a conditional block or loop was entered. Once executed within the VM Scan Environment 500 during code analysis, VM annotation instructions generated during annotated compilation modify the State Set to keep track of the execution context.

| State Flag | Meaning |
| --- | --- |
| FOR_LOOP | Marks the block inside a for loop |
| WHILE_LOOP | Marks the block inside a while loop |
| IF | Marks a conditional block |
| ELSE | Marks the else part of a conditional statement |

The table below lists some important annotation instructions. For instance, the instruction PushFlag pushes a state flag FlagName to the top of State Stack, while PopFlag FlagName pops the respective flag from the stack.

| Instruction | Parameters | Meaning |
| --- | --- | --- |
| PushFlag | FlagName | Add a flag to the current execution context. If the flag is already set, increase its counter. |
| PopFlag | FlagName | Remove a flag from the current execution context. If the flag's counter is greater than one, decrease the counter instead. |
| PushFlagsFromValue | VariableId, PrefixId | Call PushFlag for each value flag set for the value referenced by variable VariableId, prefix the flag's name with PrefixId. |
| PopFlagsFromValue | VariableId, PrefixId | Call PopFlag accordingly. |

Listing 3 demonstrates the use of the PushFlagsFromValue instruction. In this example scenario, a database API requires the next( ) function to be called before a database row is accessed. As a rule of an example ruleset, it is defined that the rows can only be accessed from within a while loop. Accessing a row outside of the loop as shown in line 6 of the code example is not allowed and should be identified as a vulnerability.

Listing 3 Code to be scanned, making use of the PushFlagsFromValue instruction

```
1 var res = $db.execute("SELECT * FROM \"user\"");
2 while(res.next( )) {
3    var username = res.getField("username");
4    alert("User: " + username); // PERFECTLY FINE
5 }
6 alert("Last user: " + res.getField("username")); // NOT ALLOWED
```

The statement in line 2 of listing 3 will result in the instructions shown in listing 4, generated by the VM Compiler.

Listing 4 Generated instructions for while(db.next( ))

```
1 while_loop:
2 01d   LoadVariable 0              ; Load res
3 01e   LoadConst 5                  ; Load "next"
4 01f   LookupInTable                ; Lookup "next" in res
5
6 generic_instrumentation;
7 020   LookupVmCallback FUNCTION_CALL   ; Lookup "function call"
8 ; instrumentation syscall
9 021   LoadConst 3                  ; Load "fun"
10                                   ; (as opposed to "new")
11 022  Dup 3                        ; Duplicate ptr to function
12                                   ; res.next on the stack
```

| Listing 4 Generated instructions for while(db.next( )) |
| --- |

```
13 023   LoadThresByteInt 0              ; Load number of parameters
14                                        ; to call to next( ) (0)
15 024   Call 3 0                         ; Call instrumentation
16
17 loop_condition;
18 025   Call 0 1                         ; Call next( )
19 026   Dup 1                            ; Duplicate the result
20                                        ; of next
21
22 loop_condition_instrumentation:
23 027   LookupVmCallback WHILE_CONDITION ; Lookup loop instrumentation
24                                        ; syscall
25 028   Dup 2                            ; Duplicate the result of
26                                        ; next (again)
27 029   Call 1 0                         ; Call instrumentation with
28                                        ; result
29                                        ; of the while( ) condition
30                                        ; (result of call
31                                        ; to res.next)
32
33 loop_condition_enter;
34 02a   PushFlag 10                      ; Mark state as "WHILE_LOOP"
35 02b   PushFlagsFromValue 11            ; Mark state as
36                                        ; "_WHILE_DB_NEXT_CALL"
37                                        ; + flags of next( ) retval
38
39 loop_condition_main:                   ; The loop's body
40 [...]
41
42 loop_finished:                         ; The result of next( ) is
43                                        ; still on the stack
44 041   PopFlag 10                       ; Remove state flag
45                                        ; "WHILE_LOOP"
46 042   PopFlagsFromValue 11             ; Remove state flag
47                                        ; "_WHILE_DB_NEXT_CALL"
```

Once the while loop is entered, represented by section "loop_condition_enter" of the generated instructions, the state flags WHILE_LOOP and WHILE_DB_NEXT_CALL are pushed onto the state stack. DB_NEXT_CALL is the value flag of the return value of the call to res.next( ) The value flag is prefixed with WHILE such that WHILE_DB_NEXT_CALL becomes a state flag. Both state flags are popped when the loop is finished (section "loop_finish").

The ruleset code in listing 5 as an example ruleset definition makes use of the state stack to identify calls to getField( ) that are made outside of the while loop in line 6 of listing 3:

| Listing 5 An example ruleset definition |
| --- |

```
 1 var dbf = function( ) { };
 2 dbf.prototype.next = function( ) {
 3     var b = true; vfcp.flag(b, /DB_NEXT_CALL/a);
 4     return b; }
 5 dbf.prototype.getField = function(fieldName) {
 6     if (!vfcp.instate(/_WHILE_DB_NEXT_CALL/a)) {
 7     // Accessing getField( ) outside the while loop;
 8     // GENERATE A FINDING HERE
 9     }
10 }
11 api.$db = { };
12 api.$db.execute = function(query) {
13     // check for SQL Injections in the query, not done here
14     return new dbf;
15 }
```

In addition to VF instructions, the VM Compiler also generates instrumentation instructions for function calls, loops, and all operators during the annotated compilation step. This can be seen in section "generic_instrumentation" of the generated instructions, line 020, for function calls, and section "loop_condition_instrumentation", line 027, for loops.

When operators are used, the annotated compilation step generates instrumentation instructions to inform ruleset code about their usage. The ruleset code is then able to inspect the code during execution. For example, for the comparison a==b, the instrumentation code, i.e., the EQ_OPERATOR of the VM, is called during execution of the code to be analyzed. This is shown in listing 6 for operators.

| Listing 6 Instrumentation instructions for operators |
| --- |

```
 1 002   GetGlobal 0                  ; Load global value 'a'
 2 003   GetGlobal 1                  ; Load global value 'b'
 3 004   EqC                          ; Perform an equality operation
 4 005   Dup 1                        ; Duplicate the result
 5                                    ; of the operation
 6 006   LookupVmCallback             ; Lookup the syscall
         EQ_OPERATOR
 7                                    ; for == instrumentation
 8 007   Flip                         ; Flip the stack so the result
 9                                    ; of == comes before the
10                                    ; instrumentation ptr
11 008   GetGlobal 0                  ; Load global 'a' again
12 009   GetGlobal 1                  ; Load global 'b' again
13 00a   LoadConst 2                  ; Load '==' as a string
14 00b   Call 4 0                     ; Call instrumentation:
15                                    ; instr((a==b), a, b, '==')
```

Syntax errors do not abort the annotated compilation. Instead, the compiler 400 generates instrumentation code to inform the ruleset code about syntax errors. Subsequently, the ruleset code can, for example, create a finding.

The annotated compilation transforms source code to be scanned into bytecode in an error tolerant fashion, while annotating and modifying the source code to ensure that the scan finishes in finite time and to provide execution context information to the ruleset code.

Concrete Compilation

The ruleset code will be compiled in such a way that the generated ruleset bytecode 402 can be executed within the VM. Compilation of ruleset code is referred to as concrete compilation in contrast to annotated compilation. During execution of the compiled source code, the ruleset code intercepts API calls from the code to be scanned to generate findings. Interception happens at the bytecode level, meaning the ruleset code can be written in a language that is different from the language of the source code to be scanned.

The instruction set of the VM Scan Environment 500 is designed for scanning dynamically typed, prototype based languages such as JavaScript. It can be used as a target for other languages as well without requiring modification. Instructions are provided to annotate the source code and modify the state stack as well as execution stack allowing the ruleset code to determine the execution context.

The VM scan environment 500 is responsible for building data flow graphs. Data flow graphs are used by the ruleset code 100 to attach data flow information to a finding. For instance, for a finding "SQL injection using external user input," the data flow information illustrates the source of the external user input, and its path to the SQL statement.

The VM scan environment 500 has two operational modes, called annotated execution and concrete execution. The concrete execution mode can be used to run both the compiled ruleset code 402 and the compiled source code 401 to be analyzed, while the annotated execution mode is used exclusively to run compiled source code 401 to be analyzed. Compiled source code 401 to be analyzed is executed twice, once in the annotated execution mode and once in the concrete execution mode.

Annotated Execution

Annotated execution has the following characteristics: Firstly, all normal branch instructions and the RETURN instruction are ignored. By ignoring branch instructions, the VM scan environment 500 can reveal findings in branches which would go unnoticed during normal execution, since the condition for entering these branches may never have been met. Secondly, each declared function will be run exactly once in annotated execution mode, even if it is unused or unreachable. Thirdly, return statements do not terminate the execution of a function, but instead cause a system call (syscall) that can be used for instrumentation by the ruleset code 100. The ruleset code 100 can thus reason about the potential return values and return types of individual functions. For example, it can detect a function that returns strings in seven different cases but an integer in one eighth case. Ruleset code 100 can then issue a finding informing about potential unreliable behavior of such function. Since the types cannot be inferred reliably at compile time in a dynamically typed language, static type checking cannot detect such errors. Fourth, the ruleset code 100 is informed about all function definitions. It can test a defined function's behavior and flag it accordingly.

Concrete Execution

Concrete execution mode is used both to run the compiled ruleset code 402 and the compiled source code 401 to be analyzed. Compiled ruleset code 402 is run in a strict flavor of the concrete execution mode. If bugs in the compiled ruleset code 402 exist, the VM Scan Environment 500 raises an exception and terminates execution if the exception is not caught. Also, data flow and call graph information are not generated for ruleset code 100.

When compiled source code 401 to be analyzed is run in concrete execution mode, the VM Scan Environment 500 becomes error tolerant. It ignores problems such as division by zero or calling of values that are not functions. For example, when a function call is made, but the called value is not a function but of some other types, a normal JavaScript execution environment would terminate the script, or if the problem is occurring within a try block, the rest of the try block would be skipped. The VM Scan Environment 500 in contrast will ignore the failed function call and continue execution. Interception syscalls are used to inform the ruleset code 100 about erroneously behaving code. Since the VM Scan Environment 500 can compensate for incomplete or erroneously behaving code, no working code is required as in DAST approaches. Thus, the approach allows code analysis during the early stages of software development.

For all variable assignments within the compiled source code 401 to be analyzed, the VM Scan Environment 500 computes the data flow graph. Whenever a value is passed to an API function defined by the ruleset code 100, this data flow graph is made available to the ruleset code 100. Listing 7 illustrates how the ruleset code 100 performs code analysis during concrete execution with a simple flaw.

---
Listing 7 A simple flaw
---
1 demoSink (demoSource( ));
---

In this example, the functions demoSource and demoSink are used, which are two functions of an example API. Function demoSource is called without parameters and returns a result that contains user input. demoSink takes one string parameter and outputs the contents to a web browser. demoSink requires that the input string is sanitized, e.g., special characters are escaped. Thus, the VM Scan Environment 500 detects a security flaw in the above example and generates a finding.

To identify the defect and report a finding, the API is specified in the ruleset code 100 as illustrated in listing 8. The function demoSource marks the return value src with the flag USER_INPUT to, while the function demoSink checks whether its input has the flag USER_INPUT set. In case the flag is set, a finding with the identifier "10008", severity "high" and probability "100%" is reported.

---
Listing 8 Example ruleset that defines the API used in listing 7 and generates a finding if the result of a call to demoSource is fed into a call to demoSink
---
```
 1 exports.api = { };
 2 exports.api.demoSource = function( ) {
 3     var src = "DemoSource";
 4     vfcp.flag(src, /USER_INPUT/a);
 5     return src;
 6 }
 7 exports.api.demoSink = function(s) {
 8     if (vfcp.hasflag(s, /USER_INPUT/a)) {
 9         vfcp.finding({ tcid: 10008, severity: "high", probability: 100, causer: s });
10     }
11 }
```

If effective mitigations exist for a vulnerability, it cannot be exploited and thus no finding will be generated. The next step is to detect mitigations. If an API offers escaping functions, the ruleset code 100 can define stubs for them as well.

Listing 9 defines a stub function for "standardEscape". It simply copies the input parameter and sets a flag on the copy that indicates the parameter was escaped for HTML output. Properly escaped input to demoSink using the standard function defined on lines 8ff can be detected by checking for the flag HTML_ESCAPED as shown on line 17.

If a custom escaping function is used instead, that check will fail. To solve that limitation, the ruleset code 100, in particular, line 19 of listing 9 can check for the existence of the HTML entities such as "<" and ">" in the input string, that would not be present in properly escaped output. This ruleset code 100 that defines standard mitigations and detects both standard and custom mitigations is shown in listing 9.

Listing 9 Simple interception that detects standard and custom mitigations

```
1  exports.api = { };
2  exports.api.demoSource = function( ) {
3     // supply a string that needs to be escaped
4     var src = "Demo<Source>";
5     vfcp.flag(src, /USER_INPUT/a);
6     return src;
7  }
8  exports.api.standardEscape = function(s) {
9     var s1 vfcp.shallowandflagsclone(s);
10    vfcp.flag(s1, /HTML_ESCAPED/a);
11    return s1;
12 }
13 exports.api.demoSink = function(s) {
14    // no user input, no finding
15    if (!vfcp.hasflag(s, /USER_INPUT/a)) return;
16    // properly escaped, no finding
17    if (vfcp.hasflag(s, /HTML_ESCAPED/a)) return;
18    // properly escaped by custom function
19    if (!/[<>]/.test(s)) return;
20    // all other cases: finding
21    vfcp.finding({ tcid: 100, severity: "high", probability: 100,
         causer: s });
22 }
```

To examine the runtime behavior of the source code 101 to be analyzed, the ruleset code 100 can use placeholder values to avoid the need for actual user input. For example, when a request parameter from a URL is requested, the placeholder value "<simulated>user&input" is created and flagged as USER_INPUT. The special characters <, > and & can be used to detect XSS attacks: Any API function accepting HTML input should not see the special characters in values flagged as USER_INPUT. Otherwise, the ruleset code 100 can generate an XSS finding.

To yield even better scan results, the ruleset code 100 can be programmed in such a way that it reads interactively input from the user, and it calls the real-world API. The ruleset code 100 is responsible for ensuring that only such API calls are passed to the real world that do not allow the code to be analyzed to alter the real-world environment. For example, an SQL SELECT statement is permissible to be passed on to the real world, while an SQL UPDATE statement usually is not.

Because the compiled source code 401 to be analyzed is executed normally in the concrete execution mode, the number of branch paths that need to be considered is often reduced considerably. Combinations that do not occur in real world scenarios are not considered. This reduces scan time and the false positive rate. For example, consider a function call to a generic hashing function defined in listing 2: hash("SHA256")(input).

By executing the function, the VM Scan Environment 500 can determine whether the used algorithm is SHA-256 or a broken one, since the VM Scan Environment 500 makes use of the runtime information that (getYear( )>2016) evaluates to be true. This information is not available at compile time. Conversely, if all possible branches of the getHashValue( ) function call are executed, the VM Scan Environment 500 would wrongly assume that MD5 hash algorithm is returned and generate false positives.

To be able to analyze the source code 101 and generate findings, the ruleset code 100 has access to various VM specific ruleset library functions. The following table lists the most important ones.

| Function | Purpose |
| --- | --- |
| vfvm.flag | Set a flag for the given variable |
| vfvm.hasflag | Check if a variable has a specific flag set |
| vfvm.flags | Return a list of all flags for the given variable |
| vfvm.dataflow | Inspect the data flow graph of the given variable |
| vfvm.isinstate | Check the state stack |
| vfvm.getlineinfo | Inspect the line information of a given variable |
| vfvm.addstateflag | Add a flag to the state stack |
| vfvm.delstateflag | Remove a flag from the state stack |
| vfvm.shallowcopywithflags | Copy a variable's value and all of its flags |
| vfvm.finding | Generate a finding |

The vfvm.flag function is typically used to mark a value as containing user input, database output, sensitive data from a database, or anything that is relevant for the analysis. Conversely, vfvm.hasflag is used to inspect a value's flags. This is typically used in data flow sinks, such as a function accepting a string and writing that string as HTML to a browser.

The vfvm.isinstate function is used to query the state stack. The state stack is modified by the VM Scan Environment 500 during execution. Value flags are pushed on the state stack using the PushFlagsFromValue VM instruction. The ruleset code 100 is responsible for generating findings. For this purpose, the vfvm.finding function is used.

In addition, the ruleset engine has access to JavaScript library functions as specified in the ECMA standard.

Finally, the report generator 600 reads the structured representation of the findings 501 as result of analysis, and transforms them into human-readable representations 601, e.g., PDF-documents, or results in a user interface as "finding manager", as well as machine-readable exchange formats 602, e.g., XML or CSV files, that allow for further processing. For example, to ease developers into investigating the findings, a finding manager with graphical user interface can be used to highlight the relevant source code and illustrate the data flow.

Figure 3:
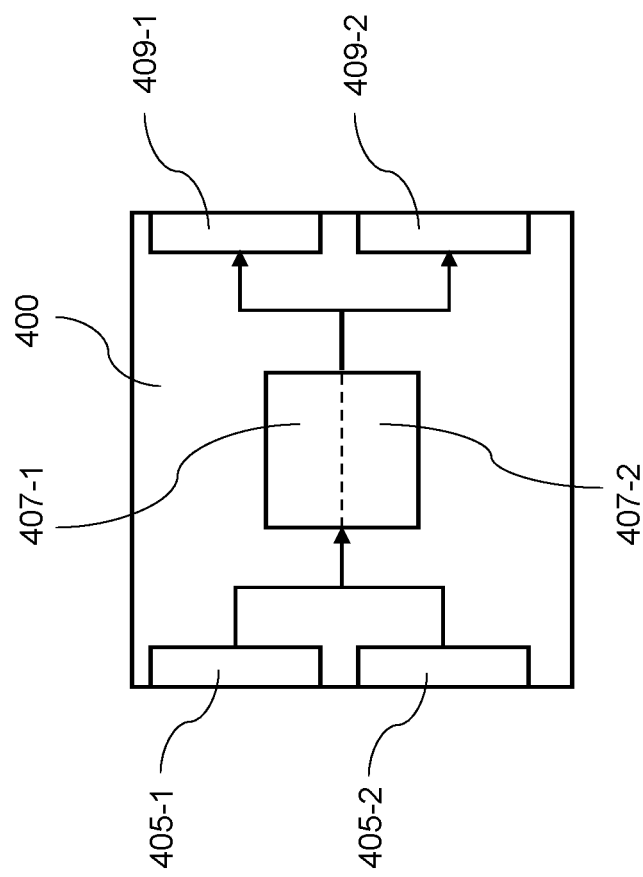
FIG. 3 shows a schematic view of a compiler according to an exemplary embodiment of the invention.

FIG. 3 shows a schematic view of a compiler 400. The compiler 400 includes an interface 405-1 for receiving the ruleset code 100 declaring programming interfaces of a target framework and includes rules that define an admissible execution context when invoking the programming interfaces. Further, the compiler 400 includes an interface 405-2 for receiving the source code 101 to be scanned for vulnerabilities.

The compiler 400 includes a compiling means 407-1 configured to compile the source code 101 into a first execution code 401 having additional instructions inserted to facilitate tracking of an actual execution context of the source code; and a compiling means 407-2 configured to compile the ruleset code 100 into a second execution code 402 that can be executed together with the first execution code 401. Further, the compiler 400 includes an interface 409-1 configured to output the first execution code 401 and an interface 409-2 configured to output the second execution code 401. The first and the second executions codes 401 and 402 can be output as electronic files.

The compiling means 407-1 and 407-2, the interfaces 405-1, 405-2, the interfaces 409-1 and 409-2, and the compiler can be implemented by software modules that run on a computer having a processor and one or more non-transitory computer readable storage media.

Figure 4:
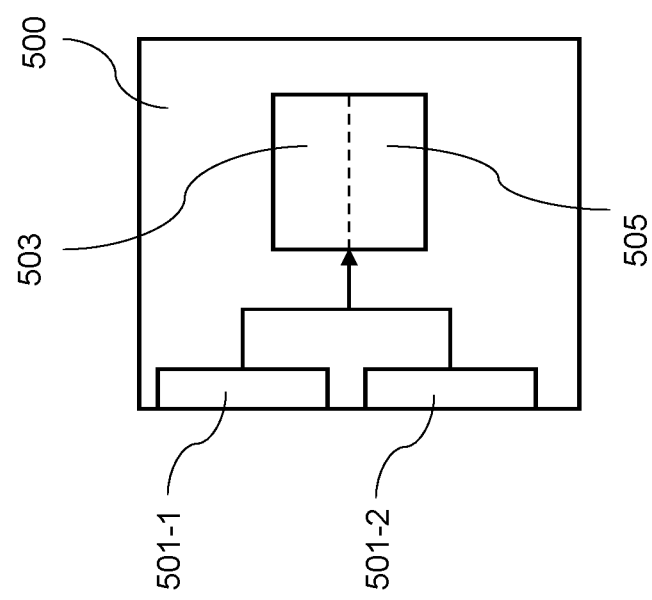
FIG. 4 shows a schematic view of a virtual machine according to an exemplary embodiment of the invention.

FIG. 4 shows a schematic view of a virtual machine 500. The virtual machine has a special instruction set to keep track of the execution context, when running the first execution code 401.

The virtual machine 500 includes an interface 501-1 configured to receive the first execution code 401 having additional instructions inserted to facilitate tracking of an actual execution context of the source code 101. Further, the virtual machine 500 includes an interface 501-2 configured to receive the second execution code 402 that declares programming interfaces of a target framework and includes rules that define an admissible execution context when invoking the programming interfaces.

Further, the virtual machine 500 includes execution means 503 for executing the first execution code 401 within the virtual machine 500 and for passing calls of the programming interfaces to the second execution code 402. In addition, the virtual machine 500 includes a detecting means 505 configured to detect a software vulnerability when the actual execution context of disagrees with the admissible execution context.

The interfaces 501-1 and 501-2, the execution means 503, the detecting means 505, and the virtual machine 500 can be implemented by software modules that run on a computer having a processor and one or more non-transitory computer readable storage media.

Figure 5:
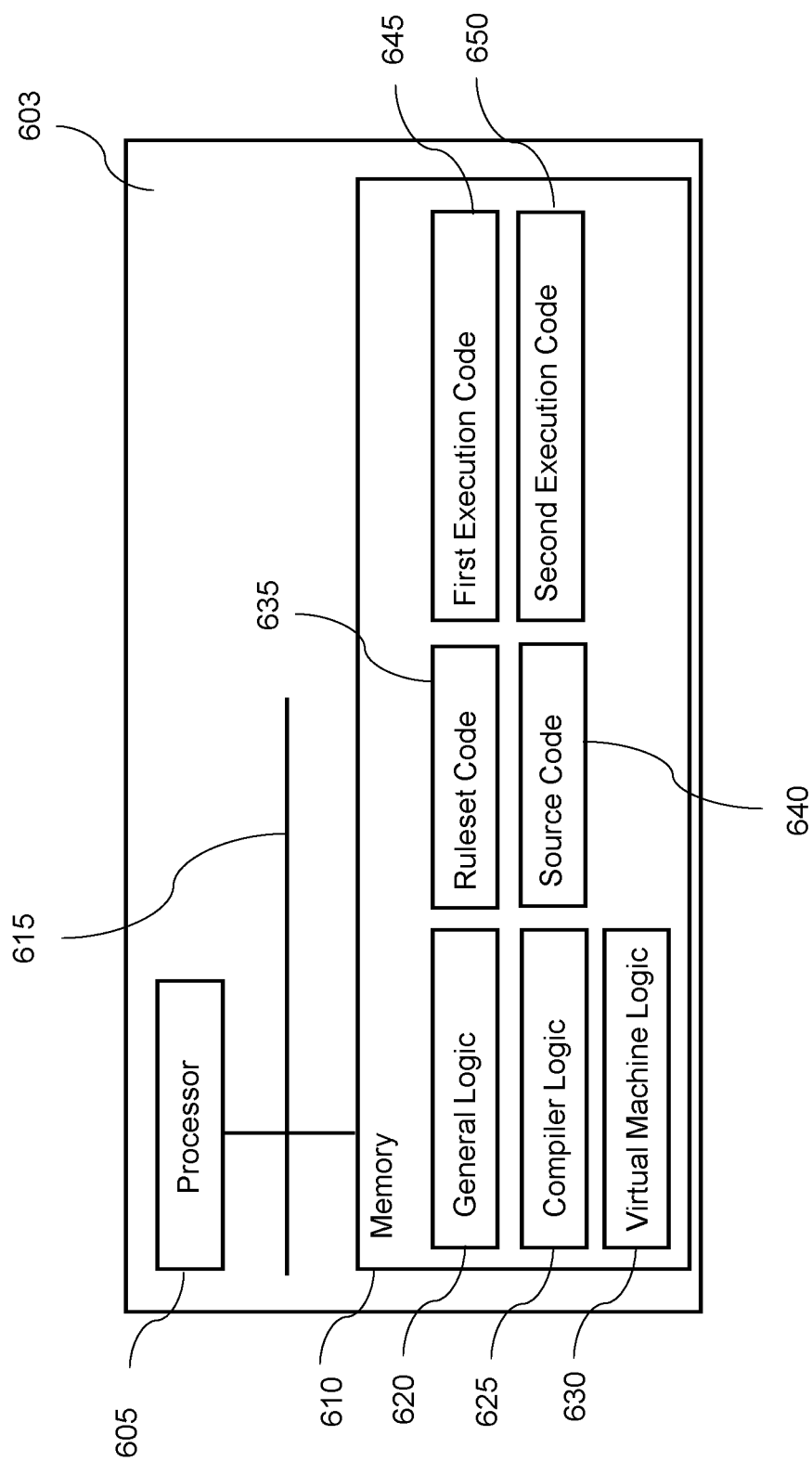
FIG. 5 shows a block diagram of a computing device configured to perform the method for detecting vulnerabilities in software to protect a computer system from security and compliance breaches according to an exemplary embodiment of the invention.

FIG. 5 is a block diagram of a computing device 603 configured to perform the method for detecting vulnerabilities in software to protect a computer system from security and compliance breaches. The computing device 603 includes processor 605 and memory 610. Processor 605 is in communication with memory 610 via bus 615. As shown in FIG. 5, memory 610 stores general logic 620, compiler logic 625, and virtual machine logic 630. In addition, memory 610 stores ruleset code 635, source code 640, first execution code 645, and second execution code 650.

Control logic 620 includes instructions that enable the computing device 603 to perform general tasks such as controlling the communication between the processor 605 and the memory 610, control input and output devices, e.g., a keyboard and a display (not shown), and network devices configured to communicate with other computing devices (not shown). The processor 605 is, for example, a microprocessor or a microcontroller that executes instructions for control logic 620, compiler logic 625, and virtual machine logic 630. The compiler logic 625 contains computer instructions of a compiler, and, when the computer executable instructions are executed with the processor 605, they are operable to compile the source code 640 into a first execution code 645 and the ruleset code 635 into a second execution code 650. The virtual machine logic 630 contains computer instructions of a virtual machine, and, when the computer executable instructions are executed, they are operable to execute the first execution code 645 and to pass calls of programming interfaces to the second execution code 650.

The memory 610 may be read only memory (ROM), random access memory (RAM), magnetic disk storage media devices, optical storage media devices, a flash memory device, electrical, optical, or other physical/tangible memory storage devices. Thus, the memory 610 may include one or more non-transitory computer-readable storage media (e.g., a memory device) for detecting vulnerabilities in software to protect a computer system from at least one of a security breach and a compliance breach. In particular, the computing device 603 performs the operations described above in conjunction with FIGS. 1 to 4 when executing the instructions stored in memory 610.

It is understood that the foregoing description is that of the exemplary embodiments of the invention and that various changes and modifications may be made thereto without departing from the spirit and scope of the invention as defined in the appended claims. In particular, all features described with respect to method steps can be implemented by corresponding means adapted for performing the method step. All functions related to features can be method steps. All features discussed in the description or shown in the figures can be combined in various ways to simultaneously realize their beneficial effects.

What is claimed is:

1. A computer-implemented method for detecting a vulnerability in software to protect a computer system from at least one of a security breach and a compliance breach, the method comprising:
   providing a ruleset code declaring programming interfaces of a target framework and including rules that define an admissible execution context when invoking the programming interfaces, wherein the admissible execution context comprises information on or conditions for execution of the programming interfaces without software vulnerabilities;
   providing a source code to be scanned for a software vulnerability;
   compiling the source code into a first execution code having additional instructions inserted therein to facilitate tracking of an actual execution context of the source code;
   compiling the ruleset code into a second execution code to be executed together with the first execution code;
   executing, for the actual execution context, the first execution code within a virtual machine and passing a call of the programming interfaces to the second execution; and
   detecting the software vulnerability when the actual execution context disagrees with the admissible execution context.

2. The computer-implemented method according to claim 1, wherein each function of the source code is invoked once.

3. The computer-implemented method according to claim 2, wherein:
   the source code includes branch instructions and return instructions, and
   the branch instructions and the return instructions are ignored when the first execution code is executed within the virtual machine.

4. The computer-implemented method according to claim 1, wherein the virtual machine provides an execution context to the ruleset code.

5. The computer-implemented method according to claim 1, wherein the virtual machine provides interception calls to the ruleset code and continues execution.

6. The computer-implemented method according to claim 1, wherein the virtual machine builds data flow graphs.

7. The computer-implemented method according to claim 6, wherein the data flow graphs are used by the ruleset code to attach data flow information to a finding.

8. The computer-implemented method according to claim 1, wherein the source code is compiled into bytecode which is suitable for code analysis.

9. The computer-implemented method according to claim 1, wherein a syntax error does not abort the compiling of the source code.

10. The computer-implemented method according to claim 9, wherein during the compiling, instructions are generated to inform the rule engine of syntax errors that occurred during the compiling.

11. One or more non-transitory computer readable storage media for detecting vulnerabilities in software to protect a computer system from at least one of a security breach and a compliance breach, the one or more non-transitory computer readable storage media being encoded with computer executable instructions of a compiler, and, when the computer executable instructions are executed, being operable to compile a source code into a first execution code and a ruleset code into a second execution code, the compiler comprising:
  a first interface configured to receive the ruleset code declaring programming interfaces of a target framework and including rules defining an admissible execution context when invoking the programming interfaces, wherein the admissible execution context comprises information on or conditions for execution of the programming interfaces without software vulnerabilities;
  a second interface configured to receive the source code to be scanned for a software vulnerability;
  a first compiling means configured to compile the source code into the first execution code having additional instructions inserted to facilitate tracking of an actual execution context of the source code; and
  a second compiling means configured to compile the ruleset code into the second execution code to be executed together with the first execution code; and
  an execution means, for the actual execution context, configured to execute the first execution code within a virtual machine and passing a call of the programming interfaces to the second execution.

12. One or more non-transitory computer readable storage media for detecting vulnerabilities in software to protect a computer system from at least one of a security breach and a compliance breach, the one or more non-transitory computer readable storage media being encoded with computer executable instructions of a virtual machine, and, when the computer executable instructions are executed, being operable to execute a first execution code and to pass calls of programming interfaces to a second execution code, the virtual machine comprising:
  a first interface configured to receive the first execution code having additional instructions inserted to facilitate tracking of an actual execution context of a source code;
  a second interface configured to receive the second execution code that declares the programming interfaces of a target framework and includes rules that define an admissible execution context when invoking the programming interfaces, wherein the admissible execution context comprises information for execution of the source code;
  execution means, for the actual execution context, configured to execute the first execution code within the virtual machine and to pass a call of the programming interfaces to the second execution code; and
  detecting means configured to detect a software vulnerability when the actual execution context of disagrees with the admissible execution context.

13. An apparatus for detecting vulnerabilities in software to protect a computer system from at least one of a security breach and a compliance breach, the apparatus comprising:
  one or more non-transitory computer readable storage media; and
  a processor coupled to the one or more non-transitory computer readable storage media, wherein the processor:
    compiles a source code into a first execution code having additional instructions inserted therein to facilitate tracking of an actual execution context of the source code, the source code being provided to be scanned for a software vulnerability;
    compiles a ruleset code into a second execution code to be executed together with the first execution code, the ruleset code declaring programming interfaces of a target framework and including rules that define an admissible execution context when invoking the programming interfaces, wherein the admissible execution context comprises execution of the source code without software vulnerabilities;
    executes, for the actual execution context, the first execution code within a virtual machine and passes a call of the programming interfaces to the second execution code; and
    detects a software vulnerability when the actual execution context disagrees with the admissible execution context.

14. The apparatus according to claim 13, wherein: each function of the source code is invoked once, the source code includes branch instructions and return instructions, the branch instructions and the return instructions are ignored when the first execution code is executed within the virtual machine, and the source code is compiled into bytecode which is suitable for code analysis.

15. The apparatus according to claim 13, wherein the virtual machine provides an execution context to the ruleset code.

16. The apparatus according to claim 13, wherein the virtual machine provides interception calls to the ruleset code and continues execution.

17. The apparatus according to claim 13, wherein the virtual machine builds data flow graphs.

18. The apparatus according to claim 17, wherein the data flow graphs are used by the ruleset code to attach data flow information to a finding.

19. The apparatus according to claim 13, wherein syntax errors do not abort the compiling of the source code.

* * * * *